(12) United States Patent
McComber et al.

(10) Patent No.: US 7,239,979 B1
(45) Date of Patent: Jul. 3, 2007

(54) METHOD AND SYSTEM FOR ORDERED FAULT CLEARANCE

(75) Inventors: Brandon S. McComber, Rochester, NY (US); Andrew T. Martin, Honeoye Falls, NY (US); David S. Matthews, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/529,068

(22) Filed: Sep. 28, 2006

(51) Int. Cl.
*G06F 11/30* (2006.01)
*G06F 15/00* (2006.01)
*G21C 17/00* (2006.01)

(52) U.S. Cl. .............. 702/185; 714/2; 714/45; 714/47; 714/48; 714/57; 358/404; 358/406; 358/468; 358/501; 358/504; 395/185.1; 395/502; 371/17; 371/291; 355/203; 355/206

(58) Field of Classification Search ................ 702/185; 714/57, 2, 45, 47, 48; 358/404, 406, 468, 358/501, 504; 395/502, 185.1; 371/17, 371/291; 355/203, 206
See application file for complete search history.

(56) References Cited

U.S. PATENT DOCUMENTS

| | | | |
|---|---|---|---|
| 4,786,041 A | 11/1988 | Acquaviva et al. | |
| 5,467,449 A | 11/1995 | Gauronski et al. | |
| 5,490,089 A | 2/1996 | Smith et al. | |
| 6,353,899 B1 * | 3/2002 | Martin et al. | 714/57 |

* cited by examiner

Primary Examiner—Hal Wachsman
Assistant Examiner—Sujoy Kundu
(74) Attorney, Agent, or Firm—Linda Robb

(57) ABSTRACT

A method for ordered fault clearance visualization in a computer controlled print production device includes receiving data from the print production device operational sensors indicating a possible fault event. Fault analysis is performed to determine whether faults have occurred and to identify the location and type for each fault, based on the data and fault definitions. Identified faults are prioritized, with each fault assigned a unique priority and the order in which the faults are to be cleared is developed. A visualization of the print production device is presented on the graphical user interface, with graphical cues superimposed upon the visualization of the print production device to indicate the fault order, such that a single view presents all identified faults in the system and the fault order in which they should be cleared. The visualization is updated as each said fault is cleared until a no fault state is achieved.

21 Claims, 4 Drawing Sheets

METHOD AND SYSTEM FOR ORDERED FAULT CLEARANCE

BACKGROUND AND SUMMARY

This disclosure relates generally to methods and systems for fault clearance visualization in a print production device, and more particularly to a system and method for the visualization of print production faults with ordered fault clearance, including sequential visualization updates as each fault is resolved.

Print production machines may be subject to various faults which impact system operation. System faults may include, among other things, a jam in a paper path or a disabled component, such as an empty toner housing. The fault condition may result in immediate shutdown of the print device, depending upon the severity of the fault. Several approaches are currently in use to indicate the presence of a fault to the operator. In one approach, a graphical representation of the device may be displayed to the user. Parts of the device that are affected by the fault or paper jam are highlighted in some manner, for example with icons or color, etc. The device operator can view the representation to gain an understanding of which device areas require attention. However, this approach provides no indication of the order in which the faults are to be cleared. Often, if faults are not cleared in a particular order, the potential increases for other problems to occur, such as paper being sheared between two device modules, etc.

Alternatively, as a fault occurs, the user interface may display the detailed clearance instructions for that fault. If more than one fault occurs, the detailed instructions are displayed in succession leading the user through the best order to clear the faults, a process which is referred to as "Pacing". The difficulty with this approach is that the operator must view each set of detailed instructions to learn which areas are affected. Thus, a skilled operator's productivity is reduced due to the "Pacing" of the detailed fault instructions. The operator never gains a global sense of every area that is affected.

All U.S. patents and published U.S. patent applications cited herein are fully incorporated by reference. The following patents or publications are noted:

U.S. Pat. No. 4,786,041 to Acquaviva et al. ("Document Handler Jam Clearance and Job Recovery System") describes a jam clearance and job recovery system that determines whether a document has resulted in a jam being present in a first, second, or third document path jam zone, corresponding to the three distributed drive zones. A preliminary job recovery operation is attempted in which the document feeding zones are independently operated to provide unjammed documents in the third jam zone to the stacking tray or feed unjammed documents in the first jam zone to the platen, so that documents are directed to be operator removed from no more than one zone. The operator is instructed to place the removed documents either face up in the stacking tray or face down in the separate document input, depending on the jam detection position, document removal position, and copier operating condition.

U.S. Pat. No. 5,467,449 to Gauronski et al. ("Fault Clearance and Recovery in an Electronic Reprographic System") teaches a fault clearance and recovery operation in an electronic reprographic system that includes storing clearance and recovery instruction for specific system faults in memory and accessing and displaying the stored instructions upon detection of a fault occurrence. Faults having similar recovery features are classified into buckets to facilitate the clearance and recovery operations.

U.S. Pat. No. 5,490,089 to Smith et al. ("Interactive User Support System and Method Using Sensors and Machine Knowledge") describes an interactive user support system for a document processing system that controls the operation of the machine using an internally stored knowledge base derived from information and rules provided by experts in the field. Sensors monitor the operation of the machine and various user actions. The system determines whether the user needs help by comparing the operation of the machine with the information and rules in the knowledge base and interrupts the user with an offer to provide assistance. The user is not interrupted if the user is performing the proper steps to correct a problem or perform a specific job. Additionally, the user may query the system for assistance or direction.

U.S. Pat. No. 6,353,899 to Martin et al. ("Fault Management System for a Multifunctional Printing Machine") teaches a fault management system having a first document processing service for processing a first type of job and a second document processing service for processing a second type of job. A graphical user interface displays the attribute values for each job type in separate user interface dialogs. Fault related information for the first and second job types are stored in memory with their associated user interface dialogs and attribute values. The system causes the user interface to display the fault related information corresponding to the dialog being accessed.

The disclosed embodiments provide examples of improved solutions to the problems noted in the above Background discussion and the art cited therein. There is shown in these examples an improved method for ordered fault clearance visualization and resolution in a computer controlled print production device having a graphical user interface. The method includes receiving data from the print production device operational sensors indicating a possible fault event. Fault analysis is performed to determine whether faults have occurred and to identify the location and type for each fault, based on the data and fault definitions. Identified faults are prioritized, with each fault assigned a unique priority and the order in which the faults are to be cleared is developed. A visualization of the print production device is presented on the graphical user interface, with graphical cues superimposed upon the visualization of the print production device to indicate the fault order, such that a single view presents all identified faults in the system and the fault order in which they should be cleared. The visualization is updated as each said fault is cleared until a no fault state is achieved.

In an alternate embodiment there is disclosed a system for ordered fault clearance visualization and resolution in a computer controlled print production device having a graphical user interface. The system receives sensor data indicating a possible fault event and performs fault analysis to determine the number of faults and the fault types, which are identified from the sensor data and fault definitions. The identified faults are assigned a unique priority and placed in a prioritized order in which they are to be cleared. The system presents a visualization of the print production device on the graphical user interface, utilizing graphical cues superimposed upon the visualization of the print production device to indicate the fault order. The visualization provides a single view of all the identified faults in the system and the fault order in which they should be cleared. As each fault is cleared, the visualization is updated until a no fault state is achieved.

In yet another embodiment there is disclosed a computer-readable storage medium having computer readable program code embodied in the medium which, when the program code is executed by a computer, causes the computer to perform method steps for ordered fault clearance visualization and resolution in a computer controlled print production device having a graphical user interface. The method includes receiving data from the print production device operational sensors indicating a possible fault event. Fault analysis is performed to determine whether faults have occurred and to identify the location and type for each fault, based on the data and fault definitions. Identified faults are prioritized, with each fault assigned a unique priority and the order in which the faults are to be cleared is developed. A visualization of the print production device is presented on the graphical user interface, with graphical cues superimposed upon the visualization of the print production device to indicate the fault order, such that a single view presents all identified faults in the system and the fault order in which they should be cleared. The visualization is updated as each said fault is cleared until a no fault state is achieved.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
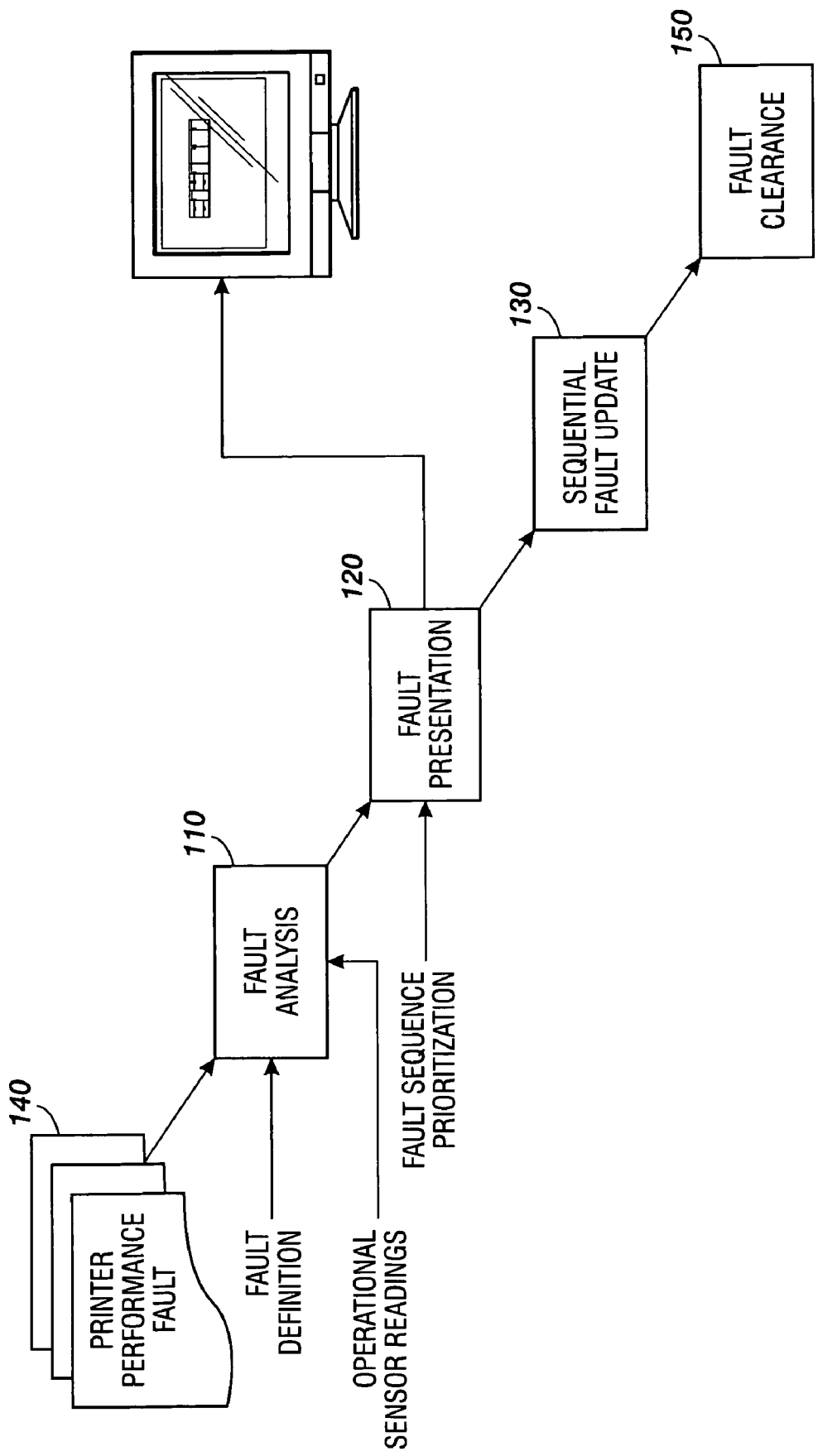
FIG. 1 is a flow chart illustrating a fault occurrence event.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The method and system for ordered fault or jam clearance improves upon the existing methods of fault clearance by providing an operator with an understanding of the state of the entire printing device and the sequence in which faults should be addressed by providing the fault clearance order on one screen, at a glance. A graphical representation of the printing device (a mimic) draws the operator's attention to the affected area of the printing device or module experiencing a fault through use of various approaches, for example mapping of a color change and icon to the mimic. The method then indicates the proper order of clearance. This may be accomplished through association of a number with the affected area on the mimic, utilization of different shades of color, or other means known in the art. An associated message list element displays text summaries of each fault, in which the list is ordered with the first step in the procedure at the top of the list and the final step in the fault clearance procedure at the bottom of the list. This provides a more efficient approach for the production shop operator, who is familiar with the detailed clearance procedures within the device and therefore does not need the detailed fault instructions to be displayed. All of the affected areas are indicated, the order in which they should be addressed is presented, and the graphical presentation is updated to indicate successful completion of an area with the next priority area to address.

Various computing environments may incorporate capabilities for supporting a network on which the ordered fault clearance method and system may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, a generalized illustration of the architecture involved in the production fault clearance visualization system is illustrated. The method and system for fault clearance visualization are intended to utilize virtual rendering, exposed through a graphical user interface (GUI), to alert the operator that a fault(s) or jam(s) has occurred during the processing of a print job and to provide instructions for clearing the faults in a specific sequence, presented visually on a user interface. A mimic, which is a graphical representation of the printing device, is then updated as each fault is cleared.

After a fault or jam occurs during print production at 140, fault analysis module 110 uses the data from operational sensor readings and fault definitions to determine where a fault has occurred within the printer and the nature of the fault. A fault sequence prioritization list is developed, in which each fault is presented in accordance with an assigned priority representing the sequence in which a series of fault conditions are to be cleared. Examples of such faults include, but are not limited to, a paper jam, a communication error, such as a loose cable, etc. At 120 the prioritized listing is presented on a graphical user interface with a mimic illustrating the printing device and indicating the location and nature of the faults. The mimic is constructed in a format that can be rendered by a modern OpenGL compatible graphics circuitry or by other means known in the art, such as a hardware based mimic, perhaps in the form of a printed control panel and LEDs. Each of the faults is brought to the operator's attention through the use of intuitive graphical cues superimposed upon the rendering of the mimic, and textual information, in layman's terms, which details for the operator the type of faults that need to be reviewed and resolved. These graphical cues may take the form of, but are not limited to, "flashing" the object that needs attention, prominent flashing arrows that point at an area of the printing device, icons, or numbers. Flashing boxes may be drawn around the problem area or object, a color change may be mapped onto the areas of the printing device where the fault is located, a figurine of a person/character could point at the problem, or any other known means known in the art could be utilized. Sequential fault update module 130 provides an update to the mimic as each fault is cleared. When all faults have been cleared, the graphical user interface provides a final notice to the operator at 150 that no faults remain to be addressed.

The particular methods performed by the system for visualization fault identification and resolution comprise steps which are described below with reference to a flow chart. The flow chart illustrates an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
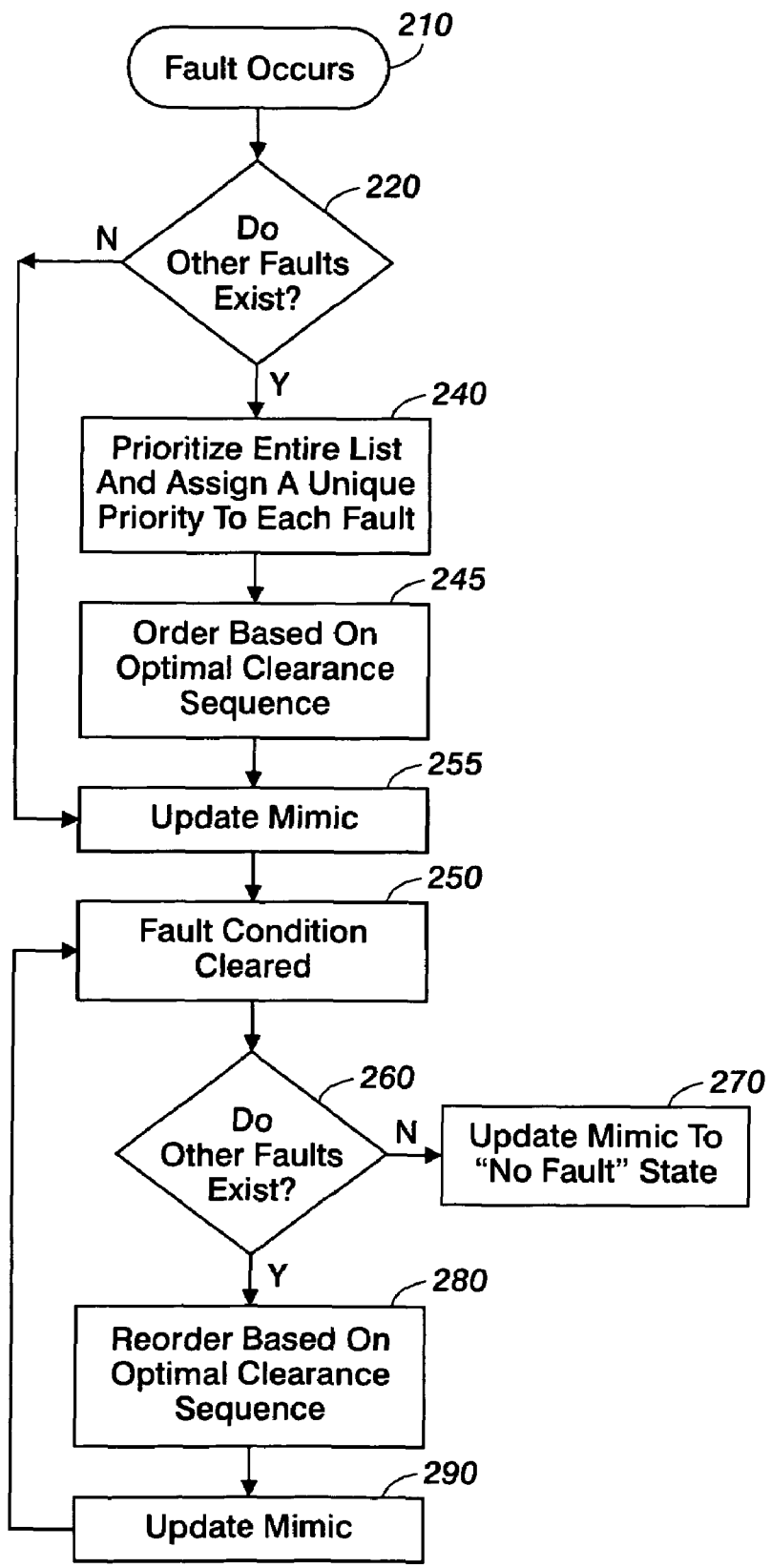
FIG. 2 is a flow chart illustrating a fault clearance event.

Turning now to FIG. 2, a flow chart illustrates one embodiment of the method for fault visualization and clearance. Upon detection of a jam or fault event at 210, an analysis is performed at 220 to determine whether additional faults exist and to identify them. If no other faults are identified, at 230 the single identified fault is assigned first priority and the mimic is updated to present a single fault. For the case in which additional faults are identified, each fault is assigned a unique priority and placed on a fault list at 240. The fault order based on the optimal clearance sequence is developed at 245 and the mimic is updated at 255. When an individual fault condition is cleared at 250, a determination is made at 260 as to whether other faults remain to be cleared. If no faults remain to be cleared, the graphical user interface presents a "no fault" state at 270. Otherwise, the user interface identifies the next fault to be cleared and reorders the list of faults based on the optimal clearance sequence at 280 and the mimic is updated at 290 to present a revised fault visualization with the revised priority list. The revised fault visualization may remove the cleared fault from the list of faults or may show it deemphasized using any means known in the art, for example by graying out the cleared fault. The system then returns to 250 to repeat the sequence of clearing individual faults, determining if additional faults remain to be corrected, prioritizing, and updating the mimic until all faults have been cleared.

Figure 3:
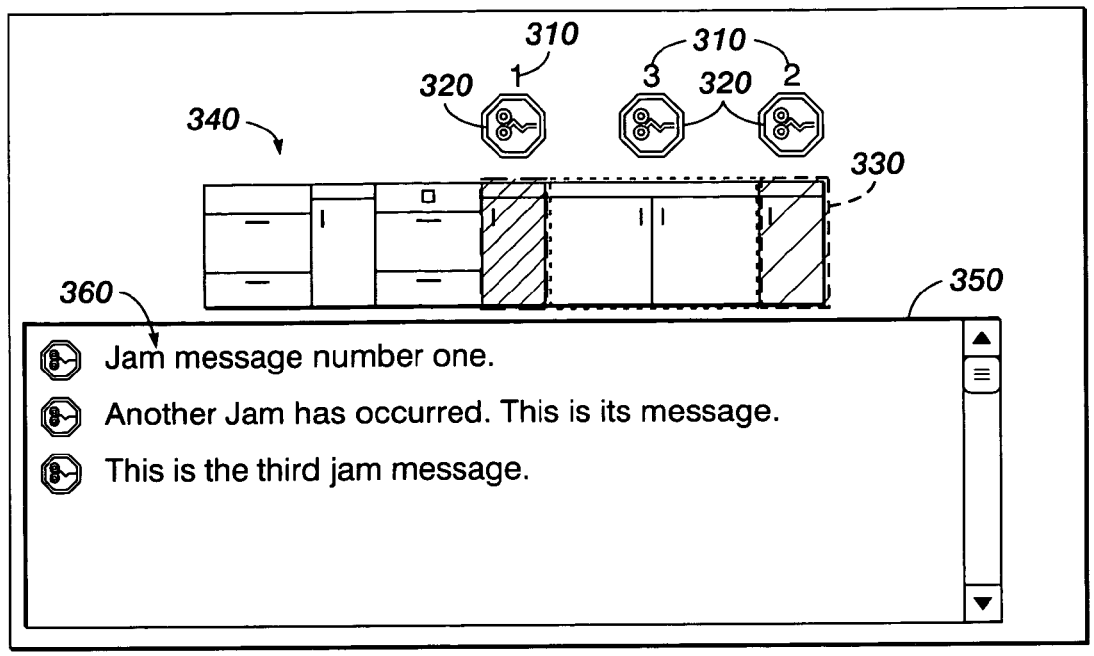
FIG. 3 is an elevational view of an embodiment of the user interface of the fault clearance system illustrating a window in which fault events are displayed.

Turning now to FIG. 3, one example embodiment of the user interface of the fault clearance system is illustrated. The interface includes a visualization of the printing device 340 on which highlighting 330 is utilized to indicate the location of a problem and the order in which faults are to be cleared. For example, red highlighting may indicate "clear now" and pink may indicate "clear in future". While highlighting is utilized for the purposes of this description, it is noted that any other means known in the art for providing a visual language may be used, such as, for example, changing icons, text, flashing, scaling, etc. Icons 320 indicate the location of a problem and, optionally, the type of problem, such as a paper jam. Numbers 310 indicate the priority for clearance of an individual fault; number priority may also be indicated by the size of the numeric character, its color, or whether it is flashing. The mimic is accompanied by a dialog box 350 with messages 360 providing a text summary of each problem. The messages are ordered with the first problem to be cleared at the top of the list and the last at the bottom.

Figure 4:
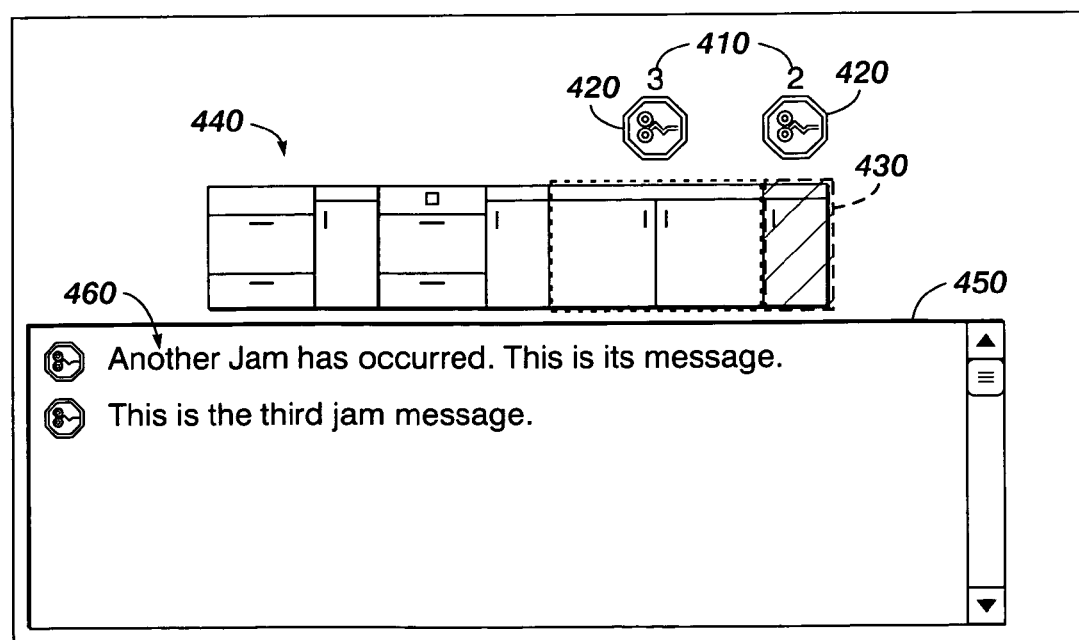
FIG. 4 is an elevational view of the user interface of FIG. 3 illustrating a window indicating that an initial fault has been cleared.

Turning now to FIG. 4, another example embodiment illustrates the interface of FIG. 3 after the highest priority fault has been cleared. On the printing device visualization 440, highlighting 430 indicates the next fault to be cleared, with highlighting removed from those problem areas that have already been cleared. Icons 420 indicate the location of remaining problems and, optionally, the type of problem, such as a paper jam. Numbers 410 indicate the priority for clearance of the remaining individual faults; fault priority may also be indicated by the size of the numeric character, its color, or whether it is flashing. The revised mimic is accompanied by a dialog box 450 with messages 460 providing a text summary of each remaining problem, with those problems already resolved removed from the list.

Figure 5:
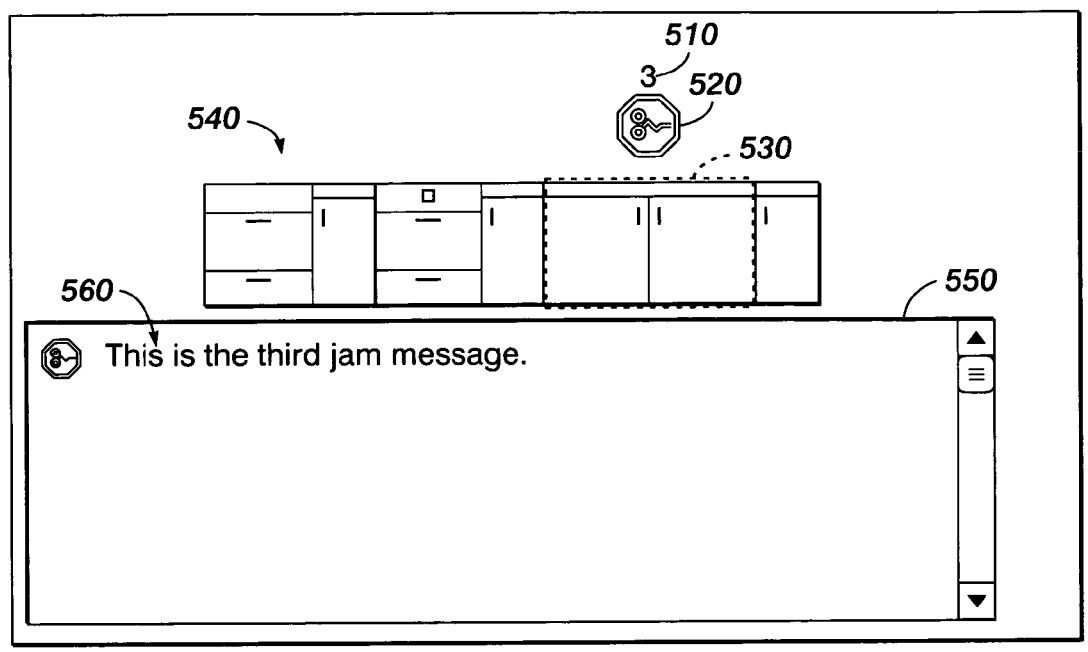
FIG. 5 is an elevational view of the user interface of FIG. 3 illustrating a window indicating that two faults have been cleared.

Referring to FIG. 5, another example embodiment illustrates the user interface when only a single fault remains to be cleared. In this embodiment, printing device visualization 540 includes highlighting 530, which indicates the next and final problem to be resolved, with highlighting removed from those problem areas that have already been cleared. Icons 520 indicate the location of the final remaining problem and, optionally, the type of problem, such as a paper jam. Number 510 indicates that this is the third and final fault to be cleared. The revised mimic is accompanied by a dialog box 550 with message 560 indicating the nature of the final remaining fault. Besides a description of the fault, the jam message 560 may also indicate the fault location (for example, Feeder 1, Tray 1, or Stacker Module, Top Tray) and fault code, an alphanumeric code or reference assigned to each fault and used for diagnostic purposes.

Figure 6:
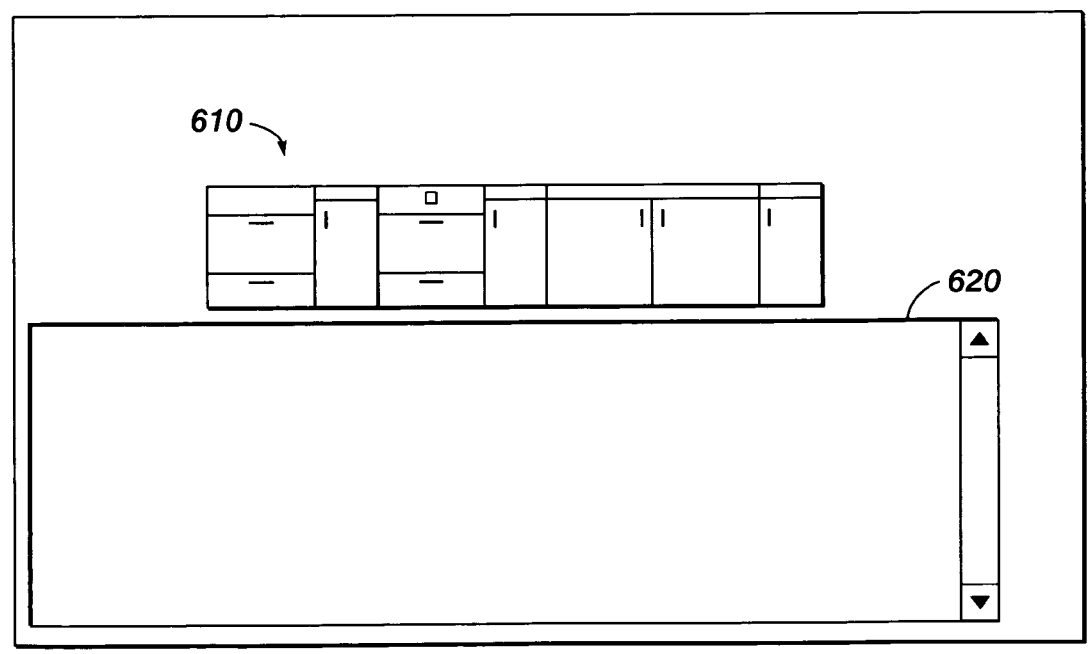
FIG. 6 is an elevational view of the user interface of FIG. 3 illustrating a window indicating that all faults have been cleared.

Turning now to FIG. 6, another example embodiment illustrates the user interface when only all problems have been resolved. In this embodiment, printing device visualization 640 does not include fault highlighting, fault indication numerals, or icons. Dialog box 620 may be empty, or may include a message to the effect that no faults are present or no faults remain to be cleared, or may be hidden.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for ordered fault clearance visualization and resolution in a computer controlled print production device having a graphical user interface, comprising:
   receiving data indicating a possible fault event, wherein said data is received from the print production device operational sensors;
   performing fault analysis to determine whether at least one fault has occurred and to identify the location and fault type for each said fault, wherein said fault type is identified from said data and from fault definitions;
   prioritizing said identified faults when a plurality of faults are identified, wherein each fault is assigned a unique priority;
   developing a fault order based on the optimal clearance sequence, wherein said fault order comprises the order in which said prioritized faults are to be cleared;
   presenting a visualization of the print production device on the graphical user interface, wherein said visualization utilizes graphical cues superimposed upon the visualization of the entire print production device to indicate said fault order, and wherein said visualization further includes a single view of all said identified faults in the system and said fault order in which they are recommended to be cleared;
   updating said visualization as each said fault is cleared, wherein said updated visualization includes a single view of all remaining identified faults in the system and said fault order in which they are recommended to be cleared;
   identifying the next said fault among said plurality of faults to be cleared, clearing said fault, and updating said visualization until all of said plurality of faults has been cleared; and
   updating said visualization to a no fault state.

2. The method for ordered fault clearance visualization and resolution according to claim 1, wherein said visualization further includes at least one text window providing descriptive messages for each fault presented in said visualization.

3. The method for ordered fault clearance visualization and resolution according to claim 1, wherein said graphical cues include at least one member selected from the group consisting of flashing the object that needs attention, prominent flashing arrows pointing at an area of the printing device, icons, numbers, flashing boxes drawn around the problem area or object, a color change mapped onto the areas of the printing device where the fault is located, and a figurine or character pointing at the problem.

4. The method for ordered fault clearance visualization and resolution according to claim 2, wherein said descriptive message for said cleared fault is removed from said text window when said fault is cleared.

5. The method for ordered fault clearance visualization and resolution according to claim 1, further comprising providing a final notice that no faults remain to be cleared.

6. The method for ordered fault clearance visualization and resolution according to claim 2, wherein said text window displays an ordered listing of said faults based on said optimal clearance sequence.

7. The method for ordered fault clearance visualization and resolution according to claim 1, wherein updating said visualization comprises removing or deemphasizing said graphical cues from said visualization.

8. A system for ordered fault clearance visualization and resolution in a computer controlled print production device having a graphical user interface, comprising:
   means for receiving data indicating a possible fault event, wherein said data is received from the print production device operational sensors;
   means for performing fault analysis to determine whether at least one fault has occurred and to identify the location and fault type for each said fault, wherein said fault type is identified from said data and from fault definitions;
   means for prioritizing said identified faults when a plurality of faults are identified, wherein each fault is assigned a unique priority;
   means for developing a fault order based on the optimal clearance sequence, wherein said fault order comprises the order in which said prioritized faults are to be cleared;
   means for presenting a visualization of the print production device on the graphical user interface, wherein said visualization utilizes graphical cues superimposed upon the visualization of the entire print production device to indicate said fault order, and wherein said visualization further includes a single view of all said identified faults in the system and said fault order in which they are recommended to be cleared;
   means for updating said visualization as each said fault is cleared, wherein said updated visualization includes a single view of all remaining identified faults in the system and said fault order in which they are recommended to be cleared;
   means for identifying the next said fault among said plurality of faults to be cleared, clearing said fault, and updating said visualization until all of said plurality of faults has been cleared; and
   means for updating said visualization to a no fault state.

9. The system for ordered fault clearance visualization and resolution according to claim 8, wherein said visualization further includes at least one text window providing descriptive messages for each fault presented in said visualization.

10. The system for ordered fault clearance visualization and resolution according to claim 8, wherein said graphical cues include at least one member selected from the group consisting of flashing the object that needs attention, prominent flashing arrows pointing at an area of the printing device, icons, numbers, flashing boxes drawn around the problem area or object, a color change mapped onto the areas of the printing device where the fault is located, and a figurine or character pointing at the problem.

11. The system for ordered fault clearance visualization and resolution according to claim 9, wherein said descriptive message for said cleared fault is removed from said text window when said fault is cleared.

12. The system for ordered fault clearance visualization and resolution according to claim 8, further comprising providing a final notice that no faults remain to be cleared.

13. The system for ordered fault clearance visualization and resolution according to claim 9, wherein said text window displays an ordered listing of said faults based on said optimal clearance sequence.

14. The system for ordered fault clearance visualization and resolution according to claim 8, wherein updating said visualization comprises removing or deemphasizing said graphical cues from said visualization.

15. A computer-readable storage medium having computer readable program code embodied in said medium which, when said program code is executed by a computer causes said computer to perform method steps for ordered fault clearance visualization and resolution, the method comprising:

receiving data indicating a possible fault event, wherein said data is received from the print production device operational sensors;

performing fault analysis to determine whether at least one fault has occurred and to identify the location and fault type for each said fault, wherein said fault type is identified from said data and from fault definitions;

prioritizing said identified faults when a plurality of faults are identified, wherein each fault is assigned a unique priority;

developing a fault order based on the optimal clearance sequence, wherein said fault order comprises the order in which said prioritized faults are to be cleared;

presenting a visualization of the print production device on the graphical user interface, wherein said visualization utilizes graphical cues superimposed upon the visualization of the entire print production device to indicate said fault order, and wherein said visualization further includes a single view of all said identified faults in the system and said fault order in which they are recommended to be cleared;

updating said visualization as each said fault is cleared, wherein said updated visualization includes a single view of all remaining identified faults in the system and said fault order in which they are recommended to be cleared;

identifying the next said fault among said plurality of faults to be cleared, clearing said fault, and updating said visualization until all of said plurality of faults has been cleared; and updating said visualization to a no fault state.

16. The computer-readable storage medium according to claim 15, wherein said visualization further includes at least one text window providing descriptive messages for each fault presented in said visualization.

17. The computer-readable storage medium according to claim 15, wherein said graphical cues include at least one member selected from the group consisting of flashing the object that needs attention, prominent flashing arrows pointing at an area of the printing device, icons, numbers, flashing boxes drawn around the problem area or object, a color change mapped onto the areas of the printing device where the fault is located, and a figurine or character pointing at the problem.

18. The computer-readable storage medium according to claim 16, wherein said descriptive message for said cleared fault is removed from said text window when said fault is cleared.

19. The computer-readable storage medium according to claim 15, further comprising providing a final notice that no faults remain to be cleared.

20. The computer-readable storage medium according to claim 16, wherein said text window displays an ordered listing of said faults based on said optimal clearance sequence.

21. The computer-readable storage medium according to claim is, wherein updating said visualization comprises removing or deemphasizing said graphical cues from said visualization.

\* \* \* \* \*